United States Patent Office 3,824,160
Patented July 16, 1974

3,824,160
MANUFACTURE OF COPPER DICHROMATE AND RELATED MATERIALS
Winslow H. Hartford, Charlotte, N.C., assignor to Allied Chemical Corporation, New York, N.Y.
No Drawing. Filed May 26, 1972, Ser. No. 257,294
Int. Cl. B01k 1/00; C01g 3/00, 37/14
U.S. Cl. 204—89                   10 Claims

ABSTRACT OF THE DISCLOSURE

An electrolytic method of manufacturing copper dichromate employing a copper anode and an inert cathode in an aqueous chromic acid electrolyte. The method lends itself to the use of scrap copper and spent chromic acid liquors, such as waste chromium plating liquors, as raw materials. By adjusting the pH of the solution obtained, unwanted impurities such as iron and trivalent chromium can readily be separated, thus providing a solution particularly suited to the economical production of wood preserving concentrates.

BACKGROUND OF THE INVENTION

(I) Field of the Invention

The present invention is directed to a method of manufacturing copper dichromate which, because of low cost and freedom from objectionable impurities, is particularly suited for use in the formulation of wood preservatives.

(II) Prior Art

Solutions in which copper dichromate is a major active constituent have numerous uses. In particular, they form the basis for a variety of wood preservative formulations, which are designated by the American Wood Preservers' Association as acid copper chromate and chromated copper arsenate, Types A, B, and C in their specification P5. The revision of these standards (1969) lists the empirical composition of these preservatives as follows:

| | Acid copper chromate (ACC) | Chromated copper arsenate (CCA) | | |
|---|---|---|---|---|
| | | Type A | Type B | Type C |
| Chromium as $CrO_3$, percent | 68.2 | 65.5 | 35.3 | 47.5 |
| Copper as $CuO$, percent | 31.8 | 18.1 | 19.6 | 18.5 |
| Arsenic as $As_2O_5$, percent | | 16.4 | 45.1 | 34.0 |

Traditionally, these wood preserving materials have been formulated by mixing copper sulfate (usually as $CuSO_4 \cdot 5H_2O$) with sodium dichromate $$(Na_2Cr_2O_7 \cdot 2H_2O)$$

and any necessary arsenic acid (usually as liquid 75% $H_3AsO_4$). This procedure, while acceptable for making up treating solutions for on-site use, is not desirable where the preservative is an article of commerce, for the mixtures formulated as above become unmanageable pastes which are difficult to mix, weigh, and use. Added expense is incurred if anhydrous materials are used to obviate this difficulty.

Preservatives formulated using copper sulfate and alkali dichromates will necesarily contain alkali sulfate as an inert ingredient. This material is not only useless as a preservative, but is the least soluble ingredient and hence limits the concentration at which solutions can be shipped. It also tends to make the solution corrosive to steel. When wood has been treated with such preservatives, the alkali sulfate migrates to the surfaces as the treated wood seasons, leaving an objectionable white "bloom," which, although harmless, detracts from the appearance of the product and may be mistaken for fungal mycelium which connotes decay.

In recent years, there has been considerable interest in producing utility poles which can be painted and do not have the unsightly appearance and oily surface of a creosoted or pentachlorophenol-treated pole. CCA-treated poles have an attractive greenish appearance and can be painted. Their service records are unsurpassed. It is felt by some, however, that the presence of sodium sulfate impairs the electrical resistivity of the pole and may lead to failure through arcing and burning.

It is thus highly desirable to produce copper dichromate solutions for wood preservative use which are substantially free of sulfates. This has usually been done by using copper oxide or carbonate as the source of copper, and chromic acid $(CrO_3)$ as the source of chromium. These compounds are substantially more expensive than copper sulfate and sodium dichromate as sources of active ingredients.

It would undoubtedly be possible to remove most of the sodium sulfate from these solutions by concentration and crystallization, but this would also add greatly to the cost of the preservative.

SUMMARY OF THE INVENTION

The present invention is directed to an electrolytic method of manufacturing a solution of copper dichromate which is particularly applicable to the formulation of "acid copper dichromate" and "chromated copper arsenate" wood preservatives.

We have found unexpectedly that scrap copper metal which is generally the least expensive source of copper, can be efficiently used for the preparation of copper dichromate solutions and wood preservatives. This approach therefore, becomes an interesting and economic route to these products. Copper does not dissolve at a practical rate in chromic acid, however, unless an activating acid such as sulfuric, nitric, or hydrochloric is also present. The undesirability of such anions has already been discussed. Furthermore, chemical dissolution of copper in chromic acid takes place with reduction of the hexavalent chromium to the trivalent state, which is of little value in wood preservation:

$$2CrO_3 + 12H^+ + 3Cu \rightarrow 3Cu^{++} + 2Cr^{+++} + 6H_2O \quad (1)$$

It has also been proposed to first dissolve the copper in an oxidizing acid and then add this solution to the chromic acid, but this is also an unsatisfactory method, since it also entails the introduction of unwanted anions.

When a direct electric current is passed through a chromic acid solution, while employing a copper anode, we have found that the reaction:

$$Cu \rightarrow Cu^{++} + 2e \quad (2)$$

proceeds, and is substantially quantitative. Reaction (1) proceeds only to a limited extent and may usually be ignored. As will be seen from the examples to follow, the hydrogen ion concentration may be regulated so that reaction (1) is no longer significant.

DESCRIPTION OF THE PREFERRED EMBODIMENT

Any available copper metal, preferably assaying better than 95%, may be used as anode material. For the specific purpose of preparing wood preservatives, nickel and zinc impurities may be accepted in moderate amounts, for both these metals have been used successfully as preservative ingredients. (See specifications for chromated zinc chloride and copperized chromated zinc arsenate in AWPA Standard P5, also U.S. Pat. 2,469,427, disclosing the value of nickel compounds as preservatives.) The type of material known as #2 scrap, composed of smaller sized pieces with a copper purity of 99+%, is particularly suited, because the surface area is large enough to yield a practical solution rate. The pieces of scrap may be held in a basket with sutiable contacts such as is customary in electroplating small parts. The basket may be made of or coated with a resistant metal such as titanium, lead, or a noble metal, or it may be made of polyvinyl chloride or polyfluorocarbons or other chemically resistant plastic. A particular advantage may stem from the use of lead or lead-coated steel, because as is well known, lead as anode in a chromic acid electrolyte becomes coated with lead dioxide ($PbO_2$) which can oxidize trivalent chromium to chromic acid, thus reversing the undesirable effect of equation (1). Alternatively, if it is desired to oxidize trivalent chromium formed during the copper solution process or charged to the cell, in the event waste chromic acid is used, a separate lead anode may be conveniently used.

With reference to the electrolyte, pure chromic acid in aqueous solution can be used at almost any convenient concentration, although concentrations below 500 grams/liter (g./l.) are preferred. It has been found, unexpectedly, that waste plating solutions and spent chromic acid copper stripping baths can be used as the electrolyte, despite the impurities they contain. If copper is allowed to dissolve anodically until the pH of the electrolyte reaches the vicinity of 3, iron and trivalent chromium, both of which are undesirable in solutions used in wood preservation, are precipitated almost quantitatively and may be removed by filtration. If insufficient copper is present to attain a pH of 3, the pH may be adjusted after the electrolysis by addition of an alkali such as NaOH or $Na_2CO_3$. Alternately, the required alkali may be added before the electrolysis is started. The latter alternative is preferred, as it tends to minimize chemical solution of copper and the generation of trivalent chromium, and also because it yields a more readily filterable precipitate. If however, the pH exceeds 4, much of the copper will be insolubilized, and lost.

Unexpectedly favorable results are also obtained with respect to the cathode. Any inert material can be used as cathode, e.g., graphite, steel, stainless steel, etc. It might be expected that as copper builds up in the electrolyte, copper would plate out at the cathode, as it does in the usual copper sulfate plating bath. It might also be expected that, if waste plating solutions containing chrome plating catalysts such as fluosilicate and sulfate are used as electrolyte, some chromium metal would be deposited at the cathode. In practice the only deposit on the cathode is a thin, almost unweighable film of black chromium oxide. Virtually all of the cathode current goes to the liberation of hydrogen.

The other principal variables usually considered critical in an electrochemical process are current density and temperature. We have found that anode current density is in no way critical, and can be dictated mainly by the time desired to carry out the reaction and the surface area exposed. The cathode current density can be dictated mainly by convenience, but in order to minimize chromium losses at the cathode, a cathode current density not exceeding 150 amperes/ft.$^2$ is preferred. Temperature is not critical and may seek its own level as current is applied to the cell.

It will be apparent to those skilled in the art that the manufacture of copper dichromate can take place continuously if the volume of product required should warrant it. A batch process is described in the examples given, but we do not wish to limit ourselves thereto.

It will be noted that the CCA wood preservatives described above contain arsenic as $As_2O_5$. Once a solution containing the desired amount of copper and hexavalent chromium has been obtained by the electrolytic procedure described above, and any iron and trivalent chromium it may contain has been removed by pH adjustment and separation of the precipitate, the desired amount of arsenic, as an aqueous solution, generally, 75–85% liquid, or solid arsenic acid as $H_3AsO_4 \cdot \frac{1}{2} H_2O$ or $As_2O_5$ may be added and the solution then concentrated for shipment. We have found that CCA-Type A and CCA-Type C can be concentrated to 60% active oxides by weight, giving a liquid which is resistant to freezing and has a density of about 16 lb. per gallon. The Type B material has a higher arsenic content and can be concentrated only to about 40% oxides. At higher concentrations, a copper acid arsenate precipitates.

In carrying out the preferred embodiment of the present invention a quantity of scrap copper in a foraminous container, preferably of lead or a lead clad base metal, serves as the anode. Optionally, an auxiliary lead anode may be used, and is recommended in those instances where the electrolyte initially contains trivalent chromium. The lead oxide coating that forms on the lead anode serves to oxidize the undesirable trivalent chromium present in the electrolyte and that formed during the electrolysis, to the hexavalent state. In general, the Pb electrodes are relatively ineffective if the ratio of any sulfate ion present, to the hexavalent chromium ion, is high. The presence of appreciable amounts of sulfate ion should therefore be avoided. If present, it is preferable to remove the sulfate ion before using the electrolyte by treatment with barium compounds, in the manner usual in the chromium plating art.

The aqueous electrolyte preferably contains no more than about 500 g./l. of $CrO_3$, and more desirably between about 25 and 400 g./l. As the $CrO_3$ content of the electrolyte is reduced, the resistivity of the solution increases, with a corresponding increase in power requirements and associated costs. Ideally, the concentration should be within the range of from about 200 to 400 g./l. If desired, this electrolyte may consist of spent or waste chromium plating liquors, spent liquors from chromic acid copper stripping baths, fortified spent liquors or mixtures thereof. Assuming that the copper dichromate to be produced is to be used in wood preservative formulations, considerable latitude is permitted with respect to impurities contained in the scrap copper or the electrolyte. Trivalent chromium, aluminum and iron can be tolerated, since the present process includes means for their removal. Certain other metals which may be present in the scrap copper or electrolyte such as zinc and nickel, are also acceptable, since their dichromates are also effective as wood preservatives. Many conducting materials are suitable as materials of construction for the cathode such as the noble metals, carbon, iron and iron-containing corrosion-resistant alloys, such as stainless steel, providing they are inert with respect to the electrolyte. By the term "inert," we mean they are compatible with the electrolyte. Cathodes fabricated of stainless steel proved very acceptable.

Rather surprisingly, the temperature of the electrolyte is not critical. If desired, the electrolysis may be initiated at ambient temperature and carried out at autogenous temperatures.

An electric current is passed through the electrolyte to provide a cathode current density of less than 200 amperes/ft.$^2$, with a range of 20 to 150 amperes/ft.$^2$ being preferred. It is surprising and unexpected that chromium does not plate out at the cathode. Only an almost unweighable film of black chromium oxide forms thereon, and substantially all the current can be accounted for by the quantity of liberated hydrogen. The electrolysis is continued until the required amount of copper is in solution. It may be dissolved anodically until the pH of the electrolyte reaches about 3, at which point most of the iron and trivalent chromium which are undesirable, are almost completely precipitated. If insufficient copper is present to attain a pH of 3, and iron and trivalent chromium is present, the pH is adjusted to between about 2.8 and 4.0 by the addition of an alkali such as $Na_2CO_3$ or NaOH. Alternately, the alkali may be added before or during the electrolysis.

If only pure materials have been used, and there is no appreciable quantity of iron present in the electrolyte, nor trivalent chromium, because of the effectiveness of the lead anode, then the pH need only be adjusted below 4 since above this value, the copper becomes at least partially insolubilized, with resultant losses.

Assuming iron and trivalent chromium are present in the electrolyte, and the pH is within the range of about 2.8 to 4, the latter impurities are largely precipitated and may be separated by any means desired, such as by filtration. Iron, the most objectionable impurity, can be separated as an insoluble precipitate at pH 3 or higher whereas, copper chromates will precipitate at pH's somewhat below this, and chromic chromates will precipitate at pH's of about 3.8 or above. If the iron concentration is high (0.1 lb./gal. or above), the solution may require dilution with water to obtain a filterable precipitate. Care must be taken, for if the solution is too dilute, handling the increased volume can become expensive, and extra power will be required because of the increased resistivity. 25 grams of $CrO_3$/liter is suggested as a suitable lower limit.

In order to formulate certain established "acid copper chromate" or "chromated copper arsenate" wood preservative concentrates, a $CrO_3$/CuO ratio of between about 1.5/1.0 to 4.0/1.0 is sought, depending on the particular formulation of the final product desired. After determining the $CrO_3$/CuO ratio, adjustment is made to obtain the ratio, fixed by that of the desired formulation, by the calculated addition of $CrO_3$.

Arsenic acid is next added in an amount also established by the formulation desired. As has previously been pointed out, the arsenic acid is generally added as the commercial aqueous solution, running about 75 to 85%, or as the solid $H_3AsO_4 \cdot \frac{1}{2}H_2O$ or an anhydride, $As_2O_5$. For typical formulations, see the table under "Prior Art" of this specification. Finally, the solution is concentrated by evaporation, either at atmospheric or reduced pressure to obtain a concentrate containing between 35 and 65% solids. Greater concentrations (about 60% solids) are practical for formulations having a low $As_2O_5$ content (about 16%), than for formulations having a high $As_2O_5$ content (about 45%). In the latter case, the concentrates would contain about 40% solids. These concentrations are selected to give a liquid product which will not normally crystallize. They are much more concentrated than is possible when the formulations are made from copper sulfate, sodium bichromate, and arsenic acid as has frequently been done in the past, because of the presence of the inert, troublesome and less soluble sodium sulfate. The concentrates of the present invention, therefore, produce no "bloom" of the wood being preserved, and the higher concentrations mean lower transportation costs. The concentrates of the present invention are comparable to those possible when the formulations comprise copper carbonate or oxide, chromic acid and arsenic acid, but since the copper dichromate of the present invention may be made from low cost scrap copper and waste $CrO_3$ liquors, the final product is much less expensive.

By the method of the present invention, concentrates containing 35 to 65% solids, wherein the solids present may contain 35 to 70% $CrO_3$; 15 to 35% CuO and 0 to 50% $As_2O_3$, are readily prepared. Other ratios outside of these ranges can also be prepared, if desired.

Examples of our process, which are typical but not limiting as to general concept, are the following:

EXAMPLE 1

3000 liters of a chromic acid solution containing 177 g. $CrO_3$/liter is electrolyzed for 6 hours at an average current of 19,500 amperes using an electrode assembly consisting of alternating copper plates as anodes, and stainless steel plates as cathodes, spaced 1 cm. apart. The anode and cathode area are each 2270 square decimeters ($dm.^2$) and the cathode current density, 8.6 amps/$dm.^2$ (80 amps/$ft.^2$). The emf necessary to operate the cell is about 3.5 volts. At the end of electrolysis, the cathode has a light coating of black chromium oxide, and the solution has the following analysis:

| | | |
|---|---|---|
| Hexavalent Cr as $CrO_3$ | g./l | 172.3 |
| Trivalent Cr (cal'd as $CrO_3$) | g./l | 4.4 |
| Copper as CuO | g./l | 54.7 |
| Current efficiency for Cu | percent | 94.4 |

It will be noted that the weight ratio of $CrO_3$ to CuO, 3.15 is near that for CCA-Type A (3.62). By addition of $CrO_3$ and arsenic acid, a solution of CCA-Type A is readily formulated.

EXAMPLE 2

The same cell is operated a in Example 1 but auxiliary lead electrodes having an area of 700 sq. dm. are added to the cell and operated at an average current density of 5 amp/$dm.^2$ (46.5 amps/$ft.^2$). The analysis of the final cell liquor is:

| | | |
|---|---|---|
| Hexavalent Cr as $CrO_3$ | g./l | 176.7 |
| Trivalent Cr (calc'd as $CrO_3$) | g./l | 0.1 |
| Copper as CuO | g./l | 55.0 |
| Current efficiency for Cu | percent | 95.0 |

EXAMPLE 3

This example is representative of the manufacture of a wood preservative of the CCA type from a waste plating solution. While such solutions may vary greatly in composition, a representative analysis of such waste from decorative chromium plating processes is:

| | Lb./gal. |
|---|---|
| $CrO_3$ | 1.49 |
| Ni | .083 |
| $Cr^{+3}$ | .037 |
| Cu | .0185 |
| Zn | .0165 |
| Fe | .0155 |
| $SO_4$ | .012 |
| F | .0085 |
| Si | .0015 |
| Other impurities | <.001 |

1500 gal. of the above waste are charged into a cell with stainless steel cathodes and anodes consisting of lead coated steel baskets loaded with #2 copper scrap. Anode contact is effected through a spring-loading device. Copper is replaced in the baskets as consumed. Active anode and cathode surface area is about 550 $ft.^2$. After electrolysis for 37.5 hrs. at 43,000 amps., approximately 3,320 lbs. of Cu have been dissolved and the $Cr^{+3}$ has been oxidized. The current efficiency for Cu is 79%. The final cell liquor has a pH of about 1.0 and the following analysis:

| | Lb./gal. |
|---|---|
| $CrO_3$ | 1.52 |
| CuO | .289 |
| NiO | .103 |
| ZnO | .021 |
| $Fe_2O_3$ | .024 |
| Other | .01 |

Volume=15,400 gals.

The pH is now adjusted to 3.1±0.1 by the addition of NaOH solution. About 0.01 lb. of diatomaceous earth filler aid is added per gallon of solution and the mixture filtered. If desired, the cake may be washed. The cake is discarded. The filtered liquor, having a volume of 15,000 gal., has the following analysis:

| | Lb./gal. |
|---|---|
| $CrO_3$ | 1.47 |
| CuO | .28 |
| NiO | .102 |
| ZnO | .021 |
| $Fe_2O_3$ | .002 |

To the filtered liquor, 9,060 lbs. of 75% $H_3AsO_4$ are added and the mixture charged to an evaporator. About 100,000 lbs. of steam are evaporated giving about 55,000 lbs. of concentrate having the following analysis (percent by weight):

| | Percent |
|---|---|
| $CrO_3$ | 39.30 |
| CuO, NiO, ZnO | 10.86 |
| $As_2O_5$ | 9.84 |

Various modifications and alterations will become apparent to those skilled in the art without departing from the scope and spirit of the invention, and it should be understood that the latter is not necessarily limited to the aforementioned discussion.

I claim:

1. A process for the manufacture of copper dichromate which comprises passing an electric current through an electrolyte comprising an aqueous solution of chromic acid having a concentration of not more than about 500 grams of $CrO_3$ per liter, a pH not greater than about 4.0, using copper as an anode, a cathode fabricated of an inert material and employing a cathode current density of less than about 200 amperes/ft.$^2$.

2. The process of claim 1 wherein the cathode current density is within the range of 20 to 150 amperes/ft.$^2$.

3. The process of claim 1 wherein the concentration of the electrolyte lies within the range of 25 to 400 grams/liter.

4. The process of claim 1 wherein the copper anode comprises scrap copper contained within a foraminate container.

5. The process of claim 4 wherein at least part of the surface of the foraminate container exposed to the electrolyte contains lead.

6. The process of claim 1 wherein the aqueous solution of chromic acid is spent liquor containing less than 400 grams/liter as $CrO_3$.

7. The process of claim 1 wherein the pH of the electrolyte is adjusted to a value between about 2.8 and 4.0 and the solution is separated from any insoluble material present.

8. The process of claim 1 wherein the cathode is fabricated from a material selected from the group consisting of carbon, iron and iron-containing corrosion resistant alloys.

9. The process of claim 1 wherein at least one auxiliary lead-containing anode is used in addition to the copper anode.

10. An aqueous solution containing chromates of copper as a major constituent, prepared by the electrolysis of a solution having a $CrO_3$ content of between 25 and 400 grams/liter, a pH not greater than about 4.0, using an anode containing copper and employing a cathode current density of less than about 200 amperes/ft.$^2$.

References Cited

UNITED STATES PATENTS

| | | | |
|---|---|---|---|
| 569,722 | 10/1896 | Morrow | 204—287 |
| 2,288,503 | 6/1942 | Weaver | 204—89 |
| 3,278,410 | 10/1966 | Nelson | 204—285 |
| 3,305,463 | 2/1967 | Carlin | 204—89 |
| 1,125,086 | 1/1915 | Fuller | 204—97 |
| 2,099,658 | 11/1937 | Pearson et al. | 204—89 |

FREDERICK C. EDMUNDSON, Primary Examiner

U.S. Cl. X.R.

204—97